United States Patent [19]

Yamakawa

[11] Patent Number: 4,764,678
[45] Date of Patent: Aug. 16, 1988

[54] SCINTILLATION CAMERA APPARATUS INCLUDING AUTOTUNING

[75] Inventor: Tsutomu Yamakawa, Tochigi, Japan

[73] Assignee: Kabushiki Kaisha Toshiba, Kawasaki, Japan

[21] Appl. No.: 852,651

[22] Filed: Apr. 16, 1986

[30] Foreign Application Priority Data

Apr. 17, 1985 [JP] Japan ................................ 60-80239

[51] Int. Cl.$^4$ .............................................. G01T 1/20
[52] U.S. Cl. .................................. 250/369; 250/361 R
[58] Field of Search ............... 250/363 S, 361 R, 369; 364/414

[56] References Cited

U.S. PATENT DOCUMENTS 3,851,177 11/1974 Van Dijk et al. .................. 250/369
4,160,165 7/1979 McCombs et al. ................ 250/369
4,272,677 6/1981 Berthold et al. .................. 250/369

FOREIGN PATENT DOCUMENTS 0006763 12/1982 European Pat. Off. .

OTHER PUBLICATIONS

Mangoyanov et al., "Stabilization System for Multidetector Scintillation Spectrometer," Instruments and Experimental Techniques, No. 2, Mar./Apr. 1969, pp. 350-355.
Gilland et al., "Automatic Gain Control for Radiation Detection Systems," IEEE Transactions on Nuclear Science, vols. NS-16, No. 1, Feb. 1969, Proc. Symp. Oct. 23-25, 1968.

Primary Examiner—Janice A. Howell
Attorney, Agent, or Firm—Finnegan, Henderson, Farabow, Garrett and Dunner

[57] ABSTRACT

A scintillation camera apparatus comprises a plurality of photomultipliers, a plurality of high voltage control circuits, and a comparator. The photomultipliers generate radiation energy signals upon receipt of incidence light. The comparator compares the peak pulse heights of the radiation energy signals with the corresponding reference peak values to derive deviation signals. Based upon the deviation signals, the supply of the high voltages to the photomultiliers is independently controlled.

12 Claims, 6 Drawing Sheets

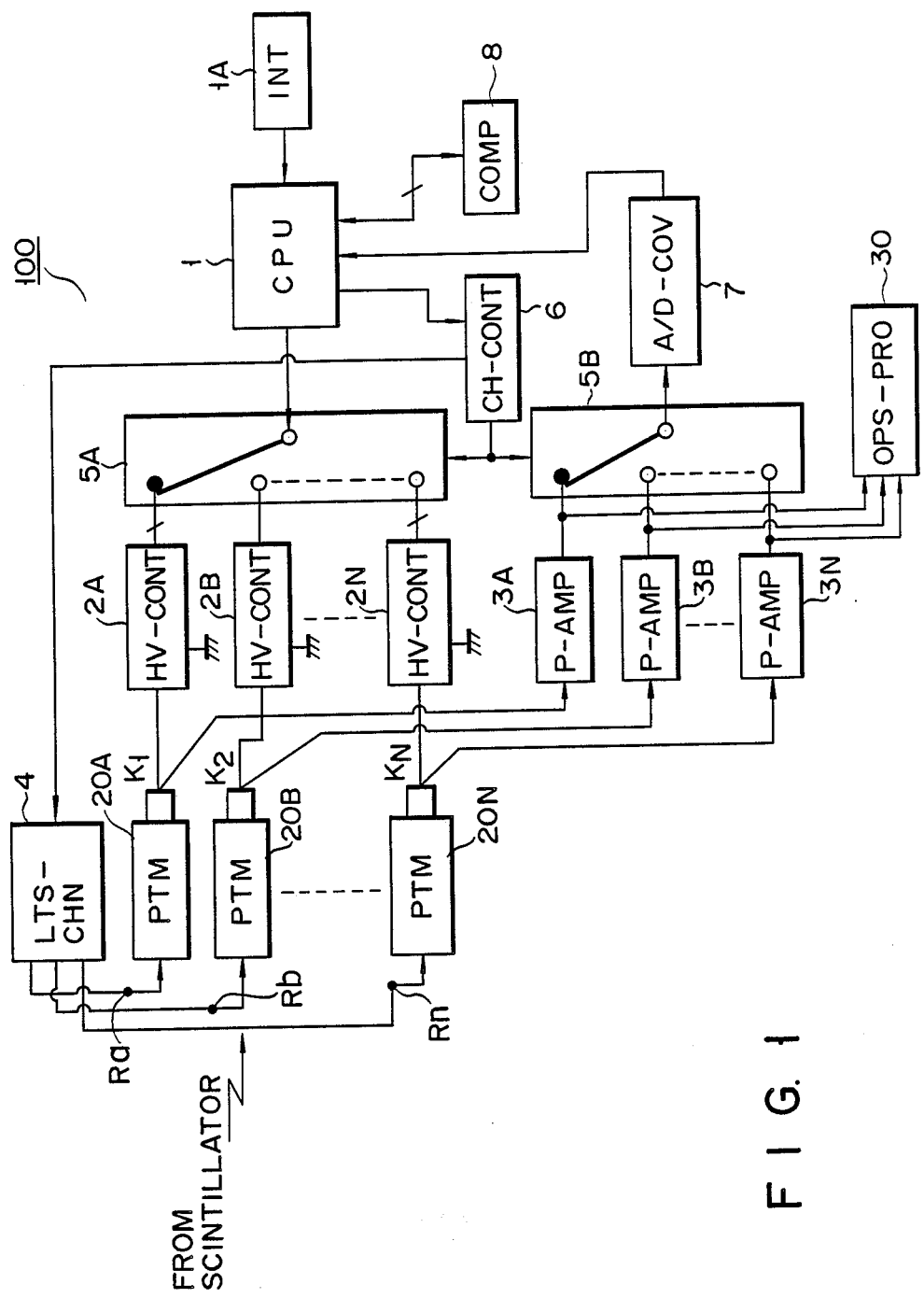
F I G. 1

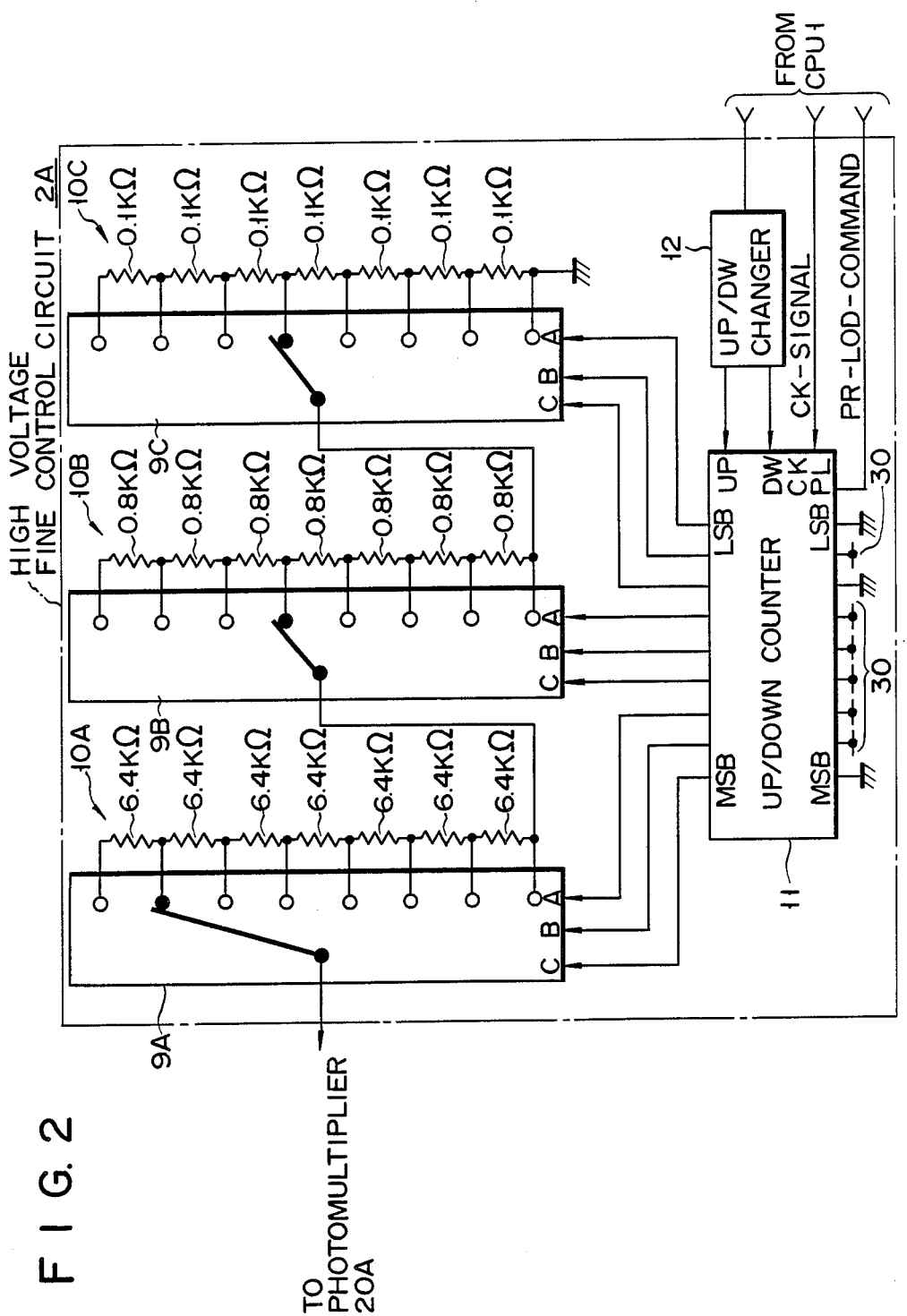
F I G. 2

SCINTILLATION CAMERA APPARATUS INCLUDING AUTOTUNING

BACKGROUND OF THE INVENTION

1. Field of the Invention

The present invention generally relates to a scintillation camera apparatus, and more particularly to an autotuning circuit for automatically controlling the high voltage applied to a photomultiplier and the output characteristics of the photomultiplier.

2. Description of the Prior Art

In a scintillation camera apparatus as one of the medical diagnostic imaging apparatuses, to adjust the high voltage applied to a photomultiplier, an operator sets an object in a predetermined position with respect to a scintillation camera, and then manually adjusts the high voltage while observing the positional relationship between a spectrum displayed on a monitor television and a window displayed thereon. In a scintillation camera apparatus operable with a computer, the CPU of the computer processes the spectrum to be displayed in a multichannel and automatically recognizes the peak value of the spectrum. The CPU controls the stepping motor interlocked with a potentiometer for fine adjustment of high voltage, on the basis of a deviation of the peak value from a target value. In this way, the peak value of the spectrum can be automatically tracked.

The output of the photomultiplier of each channel is controlled with manual adjustment of a potentiometer, which is coupled in series between the cathode of each photomultiplier and ground. Alternatively, the output of the preamplifier of each photomultiplier is automatically controlled by an attenuator with a feedback system.

The manual adjustment of the high voltage supply causes a complicated and time-consuming work, and is a lack of qualitatively precise controlling. The adjustment using the stepping motor arrangement requires a large and expensive apparatus which is also poor in durability.

With controlling the preamplifier output, a control circuit cannot be accommodated within the photomultiplier or its socket. This results in an increase in the size of the preamplifier.

An object of this invention is to provide a scintillation camera apparatus with an arrangement which is small in size, good in durability, reliability and cost performance, and further with an autotuning means capable of automatically setting the high voltage and output of a photomultiplier.

SUMMARY OF THE INVENTION

The object and other features of the invention may be accomplished by providing a scintillation camera apparatus comprising a plurality of scintillation detecting units for detecting radiation containing radiation information of an object under medical examination to derive a plurality of radiation energy signals, comparison means for comparing the peak pulse height of each of the radiation energy signals with a reference value so as to derive a deviation signal, and a plurality voltage control means, connected to the plurality of scintillation detecting means and the comparison means, for independently controlling the voltages applied to the plurality of scintillation detecting means in accordance with the deviation signals.

BRIEF DESCRIPTION OF THE DRAWINGS

For a better understanding of the above-described object and various features of the invention, reference is made in the specification to the accompanying drawings, wherein:

FIG. 1 is a schematic block diagram of a scintillation camera apparatus according to a first mode of the invention;

FIG. 2 is a circuit diagram of the high voltage fine control circuit employed in the apparatus shown in FIG. 1;

DETAILED DESCRIPTION OF THE PREFERRED EMBODIMENTS

PRINCIPLE OF FIRST MODE

Figure 3:
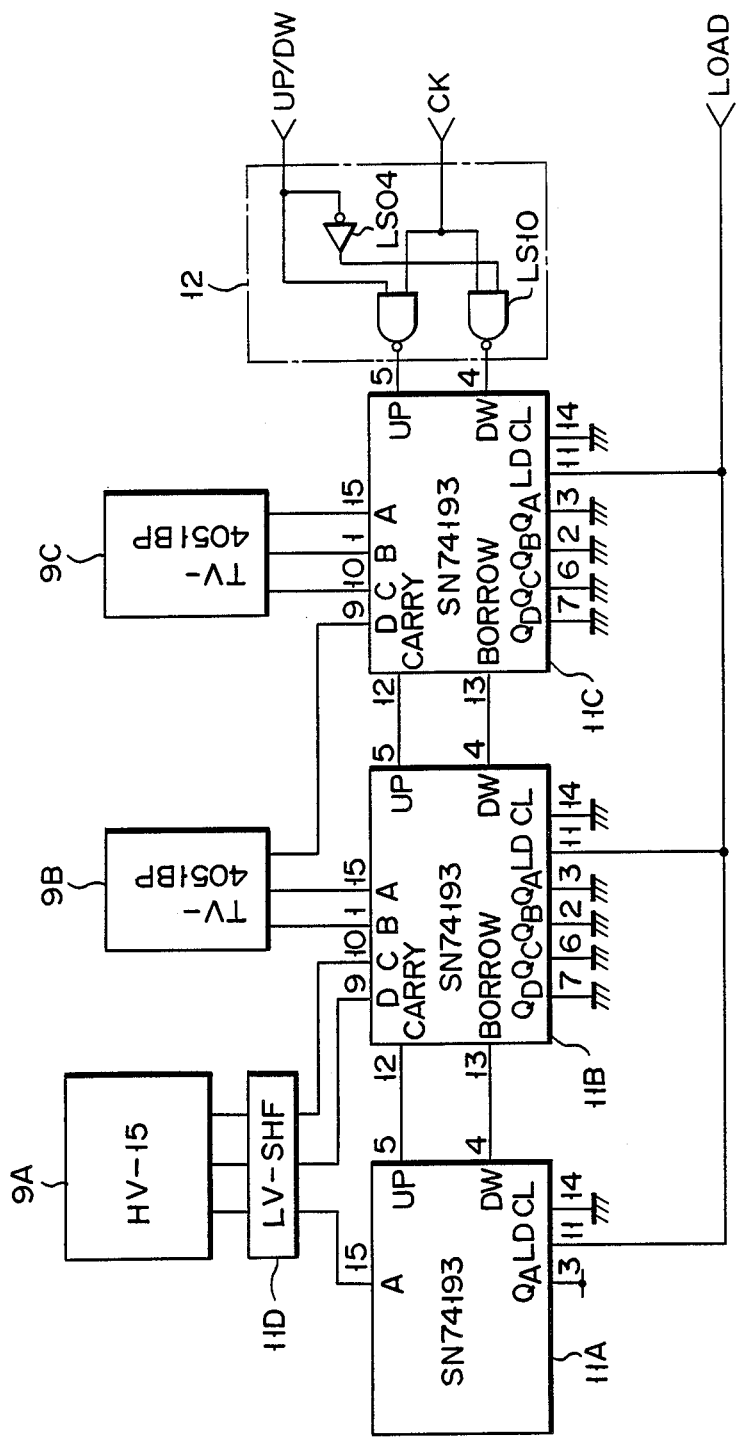
FIG. 3 is a circuit diagram of the practical counter circuit of FIG. 2.

The basic idea of the first mode of the invention is characterized by employing an autotuning means having a comparator for comparing a peak pulse height of an energy signal output from a photomultiplier with a predetermined reference peak value so as to produce a deviation signal representing the differences, a high voltage fine adjustment circuit connected between the cathode of the photomultiplier and ground for precisely adjusting high voltage of the photomultiplier, and a control means for setting adjusting conditions for the high voltage fine adjustment circuit on the basis of the deviation signal from the comparator, whereby the high voltage and output of the photomultiplier in the respective channels are automatically and independently set.

ARRANGEMENT OF FIRST MODE

FIG. 1 shows an autotuning means employed in a scintillation camera apparatus 100 according to a first mode of the present invention. The autotuning means is comprised of a CPU 1, a plurality of high-voltage fine adjustment circuits 2A to 2N (N being more than 2), a plurality of preamplifiers 3A to 3N (N being more than 2), a plurality of photomultipliers 20A to 20N (N being more than 2), a light source changer 4, a first channel selector 5A, a second channel selector 5B, a channel controller 6, an A/D (analog-to-digital) converter 7, and a comparator 8. CPU 1 has input setting means 1A and controls the autotuning means.

CPU 1 serves as a system control means. High voltage fine adjustment circuits 1A to 2N are connected between ground, on the one hand, and the cathodes of a plurality of photomultipliers 20A to 20N, on the other hand. Preamplifiers 3A to 3N amplify the peak pulse heights of the spectrum of energy signals output from N sets of photomultipliers 20A to 20N. That is to say, N sets of signal processing channels are provided in the apparatus 100. Light source changer 4 selects one of reference light sources Ra to Rn such as LEDs. First channel selector 5A selects one of high voltage fine adjustment circuits 2A to 2N. Second channel selector 5B selects one of preamplifiers 3A to 3N. CPU 1 controls channel controller 6, which in turn controls light source changer 4, and first and second channel selectors 5A and 5B.

An A/D (analog-to-digital) converter 7 A/D-converts the output of any of preamplifiers 3A to 3N, which is output from second channel selector 5B, and detects a peak pulse height of the spectrum. Comparator 8 compares this peak pulse height of the spectrum transferred from A/D converter 7 through CPU 1 with the reference peak value, and transfers, as a deviation signal, the difference between them to CPU 1.

CPU 1 transfers a channel control signal to channel controller 6. In response to the channel control signal, controller 6 controls light source changer 4, first channel selector 5A, and second channel selector 5B, to select one of these channels and to specify, for example, the light source Ra, the high voltage fine adjustment circuit 2A and the preamplifier 3A in the selected first signal processing channel.

CPU 1 transfers various control signals other than the channel control signal to high voltage fine adjustment circuits 2A to 2N through first channel selector 5A. These control signals are prepared on the basis of the deviation, i.e. the difference between the peak values.

High voltage fine adjustment circuits 2A to 2N, which are major circuits of the autotuning circuit, will be described in more detail referring to FIG. 2. The high voltage fine adjustment circuit 2A will typically be described since these circuits 2A to 2N have the same circuit arrangements.

High voltage fine adjustment circuit 2A is comprised of high voltage selection analog switches 9A to 9C, first, second and third resistor groups 10A to 10C, an up-down counter 11, and an up-down changer 12. First to third analog switches 9A to 9C each has one primary terminal and eight secondary terminals. First resistor group 10A includes (8-1) resistors (of which resistance values are equally set at 6.4 Kilo ohms) each connected between the adjacent secondary terminals of first analog switch 9A. Second resistor group 10B includes (8-1) resistors (of which resistance values are equally set at 0.8 Kilo ohms) each connected between the adjacent secondary terminals of second analog switch 9B. Third resistor group 10C includes (8-1) resistors (resistance 0.1 Kilo ohms) each connected between the adjacent secondary terminals of third analog switch 9C.

Up-down counter 11 can preset a select signal of 3 bits, or 3-bit binary data indicated by MSB to LSB, to be supplied to third high voltage selection analog switches 9A to 9C. Up-down changer 12, under control of CPU 1, is connected to the up-and-down terminals UP and DW of counter 11. The primary terminal of first high voltage analog switch 9A is connected to the high voltage adjustment terminal (not shown in detail) of the cathode of photomultiplier 20A. The last terminal of the secondary terminals (i.e. the lowest terminal) is connected to the primary terminal of second high voltage select analog switch 9B. Of the secondary terminals of second high voltage selection analog switch 9B, the last terminal is connected to the primary terminal of third high voltage select analog switch 9C. Of the third terminals of second high voltage select analog switch 9C, the last terminal is connected to the ground line.

The up-and-down terminals of up-down counter 11 are used for incrementing and decrementing up-down counter 11, and are controlled by up-down changer 12.

The preset terminal PL is provided for receiving a command signal from CPU 1. A preset value prepared on the basis of this command signal is loaded in up-down counter 11.

In FIG. 2, arrow 30 indicates that terminals of up-down counter 11 for loading the preset value into up-down counter 11 are each connected between junctions of the adjacent variable resistors (not shown).

Operation of First Mode

The operation of the high voltage fine adjustment circuit 2A thus arranged will be described.

A command to set a peak value (i.e. pulse height) of a spectrum for the photomultiplier 20A is input from input means 1A to CPU 1. In response to the command, CPU 1 transfers a control signal to channel controller 6. Upon receipt of the control signal, channel controller 6 sends a selection signal to light source changer 4, and first and second channel selectors 5A and 5B, and selects the signal processing channel in which the peak value (peak pulse height) is to be preset. That is, the channel including first light source Ra, photomultiplier 20A, high voltage fine adjustment circuit 2A and preamplifier 3A is selected in this case A command is supplied from input means 1A, whereby another command for loading a preset value is entered to the preset terminal PL of up-down counter 11 provided in high voltage fine adjustment circuit 2A. As a result, the preset value is loaded on up-down counter 11. Counter 11 sends a selection signal to first to third high voltage select analog switches 9A to 9C. The resistor, or its resistance, of groups 10A to 10C, which corresponds to the preset value, is selected, thereby setting a desired high voltage. The peak value (peak pulse height) of the output spectrum of the photomultiplier 20A at this time is sent through preamplifier 3 to A/D converter 7. The peak value is sent to comparator 8 through CPU 1, after converted into a digital signal by converter 7. Comparator 8 compares the peak value with a predetermined reference value stored therein.

The deviation, or shift, as the result of comparison effected by comparator 8, is sent to CPU 1. CPU converts it into a given number of clock pulses, and selects a counting mode of the up-down counter, count up or count down. The clock pulses are applied to the clock terminal CK of up-down counter 11. A control signal representative of the count-up or count-down is input to up-down changer 12.

Changer 12 inputs a command representing the count-up or count-down to the up terminal UP or down terminal DW of counter 11 respectively. Upon receipt of this command, counter 11 starts counting up or down, the pulses based on the preset value. The result of the counting is supplied as a 3-bit selection signal to first to third high voltage selection analog switches 9A to 9C respectively.

According to the input selection signal, the analog switches 9A to 9C provided in high voltage fine adjustment circuit 2A shown in FIG. 2, turn their contacts to the positions of first to third resistor groups 10A to 10C, as shown. These groups are arranged in that order of decreasing resistance so that the resistance is changed gradually, or stepwisely, from the first resistance when the contact position changes. This is one of the features of this invention, i.e., a gradual resistance change.

In this way, the resistance of the resistor groups connected to the high voltage fine adjustment terminal of photomultiplier 20A can be set to determine the desirable high voltage for the photomultiplier 20A. Under this condition, a peak value of the spectrum is again detected to see if it has still been deviated from the reference peak value, by comparator 8 through second channel selector 5B, A/D converter 7 and CPU 1. Any deviation can be reduced in the same adjustment way. If no deviation is detected, the setting work of the high voltage for photomultiplier 20A is accomplished.

The overall adjustment of high voltage fine adjustment circuits 2A to 2N is performed prior to the actual measurement by the scintillation camera. By this adjustment, the peak pulse height, i.e., sensitivity of each of photomultipliers 20A to 20N can have a proper value. In other words, the high voltage adjustment is independently completed for photomultipliers 20A to 20N before the actual measurement by scintillation camera commences.

Alternatively, the other time period than that for acquring image data is used for performing the above procedural operation, for each signal processing channel. By executing it for an appropriate period of time, the autotuning can be achieved with a minimum change amount of the sensitivity for each channel.

As described above, the autotuning means, first mode of the invention can make a fine tuning of the high voltage and the output of photomultipliers. Therefore, it realizes a long life and a reduced size. If the high voltage fine adjustment circuits are assembled into a module package, it may be accommodated into photomultipliers. This feature further gives size reduction of the apparatus.

The up-down counter is employed and a number of resistors with equal resistances are used. A plurality of resistor groups containing series-connected resistors are provided with different resistors. These resistor groups are switched for high voltage adjustment. Therefore, the high voltage can be continuously adjusted, realizing an autotuning of a less fluctuation of high voltage.

In the case of the autotuning for multiple signal processing channels, the channel selector can easily connect the channels to the control means.

Furthermore, use of the UP, DW and CK terminals of the up-down counter reduces the number of control terminals. For example, only three control signals, i.e., up/down control, load command and clock signals, are required for the control of 9 bits (=3 bits×3) of three analog switches 9A to 9C.

Referring back to the circuit shown in FIG. 1, the scintillation signals under the normal scintillation camera measurement are output from preamplifiers 3A to 3N, and supplied to a signal processor 30 where these are appropriately processed.

PRACTICAL CIRCUIT ARRANGEMENT

FIG. 3 shows a practical arrangement of up-down counter 11 in the high voltage fine control circuit 2A of the first mode.

The up-down counter (FIG. 2) is comprised of three resettable up-down counters may be, for example, 11A to 11C. These counters of Ser. No. 74193 type manufactured by Texas Instruments. The up/down changer 12 is comprised of two NAND gates, e.g., an LS10 NAND gate, e.g., a LS04 NOR gate. First analog switch 10A is of the high voltage type and of a type generally available, for example, from Super-Tex Inc. This switch 10 is connected to first and second up-down counters 11A and 11B via level shifter 11D having variable resistors (not shown in detail). Second and third analog switches 10B and 10C are of the same type as switch 10A and are also available, for example, from TOSHIBA. The up/down control, clock and load command signals, which are supplied from CPU 1, are supplied to related circuit components with the circuit arrangement as shown.

Arrangement of Second Mode

Figure 4:
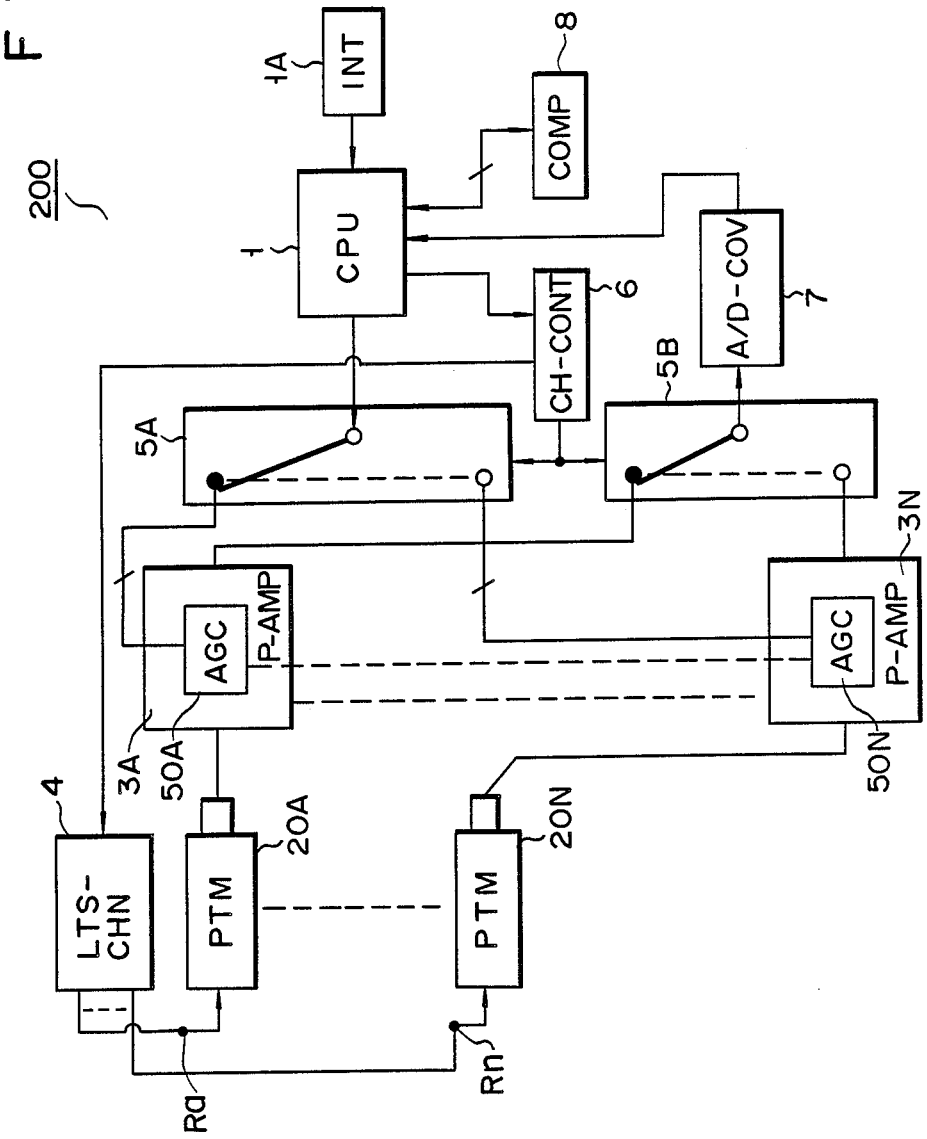
FIG. 4 is a schematic block diagram of a scintillation camera apparatus according to a second mode of the invention.

Turning now to FIG. 4, there is shown a scintillation camera apparatus 200 according to a second mode of the invention. Like reference numerals are used for designating like circuit portions in FIG. 1.

In this mode, the effects like those of the first mode, i.e., appropriate setting of the sensitivity of each photomultiplier, can be attained by automatically controlling the gains of preamplifiers 3A to 3N for amplifying the output signals of photomultipliers 20A to 20N. In brief, this mode is featured by providing automatic gain control circuits 50A to 50N in preamplifiers 3A to 3N.

Figure 5:
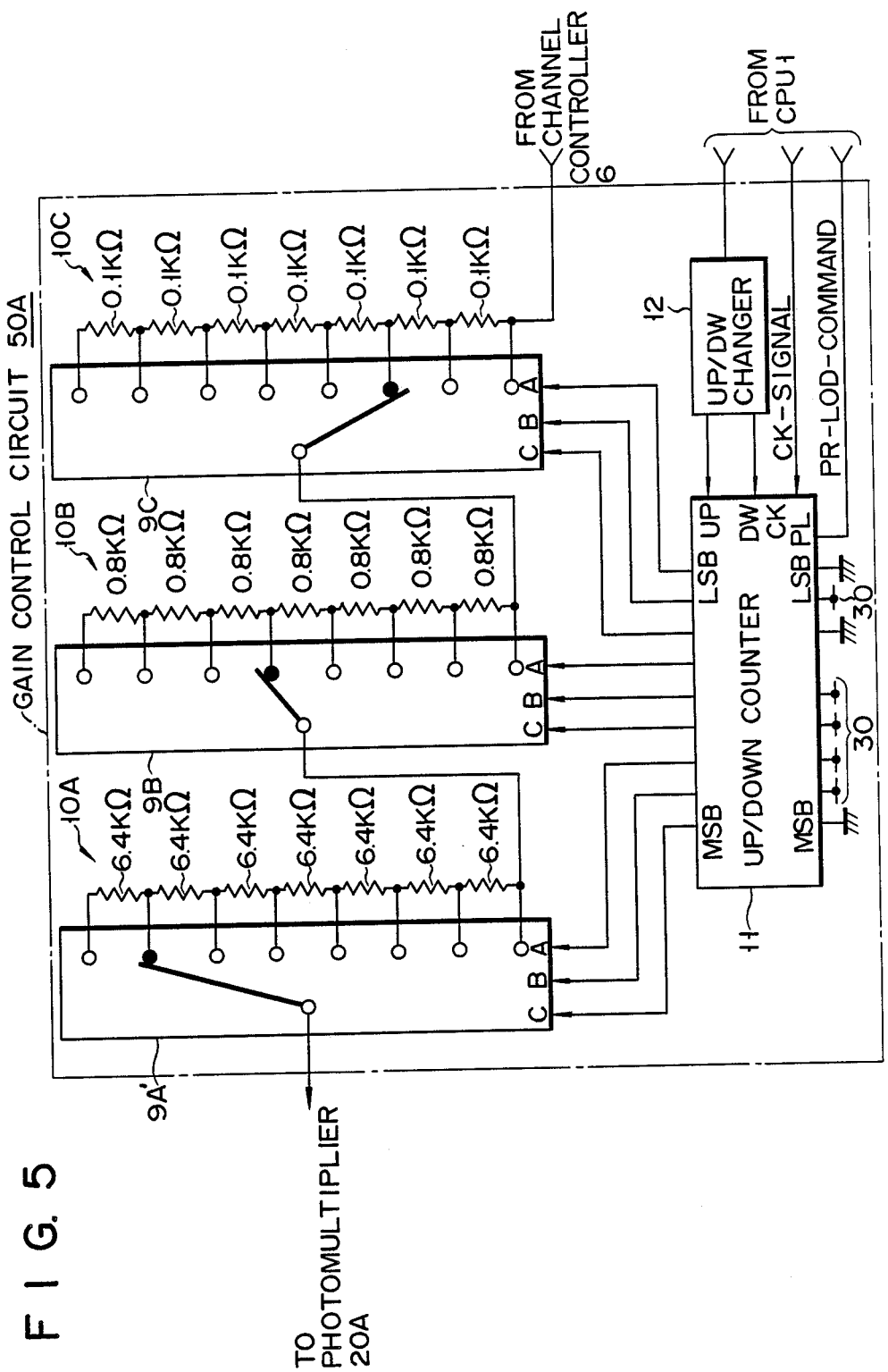
FIG. 5 is a circuit diagram of the gain control circuit employed in the apparatus shown in FIG. 4.

Automatic gain control circuits 50A to 50N have the same circuit arrangements, and hence a basic circuit of first automatic gain control circuit 50A will typically be given in FIG. 5.

As apparent from FIG. 5, this circuit is essentially identical to the high voltage fine control circuit 2A of the first mode shown in FIG. 2. The circuit 2A of the first mode is for adjusting the high voltage applied to the photomultipliers, whereas the control circuit 50A of this second mode is for gain adjustment of the preamplifier. In this respect, the electrical characteristics are different from each other. Therefore, there is no need for use of the high voltage switch for the first analog switch 9A'.

Roughly speaking, the basic operation of the automatic gain control circuit 50A is equal to that of the control circuit 2A of FIG. 2, because the resistances of the series resistors of the resistor groups 10A to 10C connected to first to third analog switches 9A' to 9C are varied depending on the operation of up-down counter 11.

Practical Circuit Arrangement of Automatic Gain Control

Figure 6:
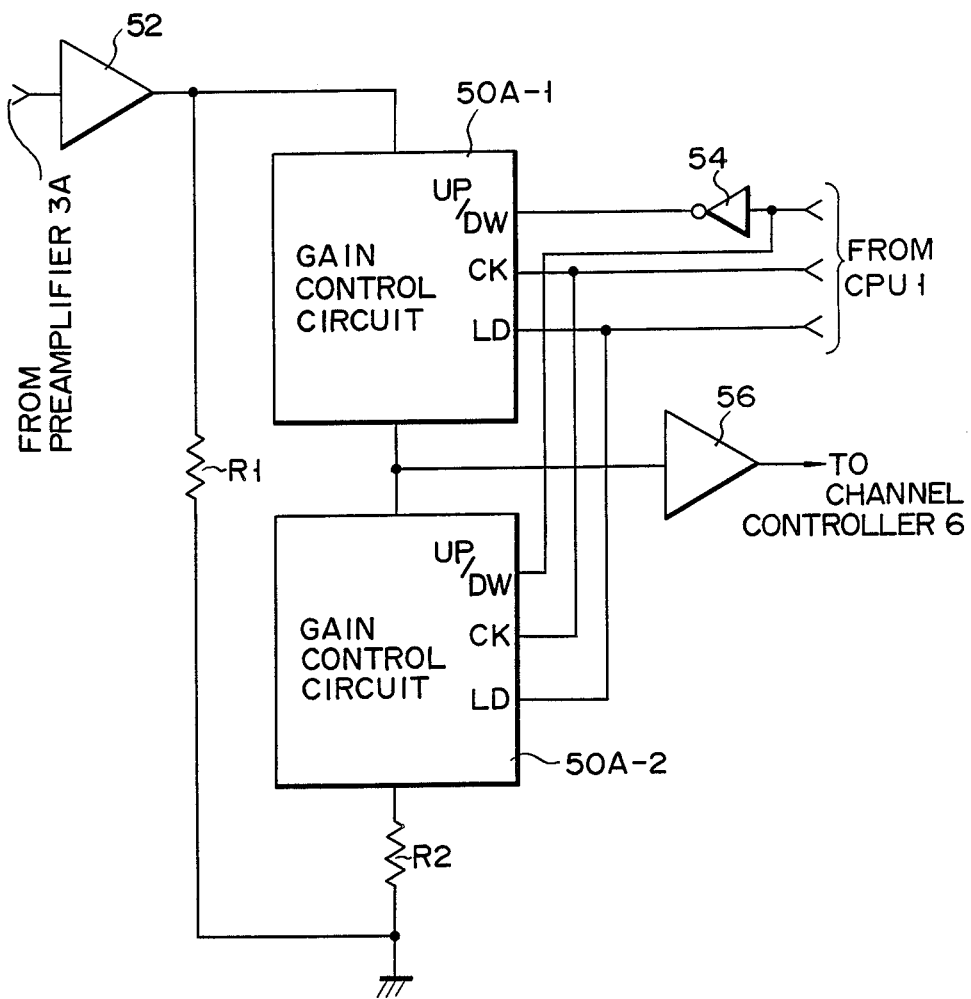
FIG. 6 is a schematic block diagram of the practical gain control circuit used in the apparatus shown in FIG. 4.

FIG. 6 shows an actual automatic gain control circuit using the basic circuit of the AGC circuit 50A of FIG. 5. As already mentioned, automatic gain control circuits 50A-1 and 50A-2 have exactly the same arrangements. A buffer amplifier 52 is provided for separating preamplifier 3A (FIG. 3) from these gain control circuits 50A-1 and 50A-2. An inverter 54 is connected to the up-down counter terminal UP/DW of circuit 50A-1 to maintain both the gain control circuits 50A-1 and 50B-2 in their inverse operation modes.

Buffer amplifier 56 is connected to a junction between these gain control circuits 50A-1 and 50B-2, thereby separating these circuits from the following channel selector. Parallel resistor R1 is an impedance converting resistor, which may compensate for the output characteristic of input buffer amplifier 52. Resistor R21 determines a variable range of the gain as determined by automatic gain control circuits 50A-1 and 50A-2.

As can be seen from the foregoing description, the second mode can automatically adjust the gains of the preamplifiers for amplifying the output signal of photomultiplier. Therefore, this mode, similar to the first mode, can automatically and independently correct a variation of the characteristic of each photomultiplier, i.e. a sensitivity variation.

The invention is not limited to the specific modes as mentioned above. Various changes and modification can be made within the spirit of the invention.

As can be seen from the foregoing description, the autotuning circuit constructed on the basis of the electrical arrangement, provides a scintillation camera apparatus which is small, durable, reliable and inexpensive, and can automatically tune the high voltage and output of photomultiplier.

What is claimed is:

1. A scintillation camera apparatus comprising:
a plurality of scintillation detection units, each having a light input surface, for detecting radiation containing radiation information of an object under medical examination to derive a plurality of radiation energy signals;
comparison means for comparing the peak pulse height of each of the radiation energy signals with a reference value to derive a deviation signal; and
a plurality of voltage control means, operatively connected between said plurality of scintillation detecting means and said comparison means, for independently controlling the voltages applied to each of said plurality of scintillation detecting means in accordance with said deviation signals, said voltage control means including: first, second and third resistor groups, each of said groups being comprised of a plurality of resistors, each of said plurality of resistors having the same resistance value, first second and third analog switches series-connected to each other via said first, second and third resistor groups, said first, second and third analog switches and resistor groups being connected to form a series circuit having a predetermined total resistance, and an up/down counter, operatively connected to said first, second and third analog switches, for controlling said first, second and third analog switches, to change the total resistance of the series-connected first, second and third resistor groups.

2. The apparatus as claimed in claim 1, wherein each of said scintillation detecting units includes a photomultiplier.

3. The apparatus as claimed in claim 1, wherein the total resistance of the resistors of said first resistor group is greater than the total resistance of the resistors of said second resistor group, and the total resistance of the resistors of said second resistor group is greater than the total resistance of the resistors of said third resistor group.

4. The apparatus as claimed in claim 1, wherein said up/down counter outputs to each of said first, second and third analog switches a 3-bit binary preset signal for controlling the analog switches.

5. The apparatus as claimed in claim 1, wherein said first resistor group is comprised of seven individual resistors each having a resistance of 6.4 kΩ, said second resistor group is comprised of seven resistors each having a resistance of 0.8 kΩ, and said third resistor group is comprised of seven resistors each having a resistance of 0.1 kΩ.

6. The apparatus as claimed in claim 1, further comprising:
a plurality of light sources positioned adjacent to said light input surfaces of said plurality of scintillation detection units; and
light source control means for controlling the supply of power to said plurality of light sources to independently derive said deviation signals for each of said plurality of scintillation detection units.

7. A scintillation camera apparatus comprising:
a plurality of scintillation detection units, each having a light input surface, for detecting radiation containing radiation information of an object under medical examination to derive a plurality of radiation energy signals;
comparison means for comparing the pulse heights of each of the radiation energy signals with a reference value so as to derive a corresponding deviation signal; and
a plurality of amplification means each including gain control means, for amplifying said plurality of radiation energy signals from one of said plurality of scintillation detection units at a predetermined amplification gain independently controlled by the corresponding deviation signal, said gain control means including: first, second and third resistor groups each of said groups being comprised of a plurality of individual resistors each having the same resistance value, first, second and third analog switches seriesconnected to each other via said first, second and third resistor groups, said first, second and third analog switches and resistor groups being connected to form a series circuit having a total resistance, and an up/down counter operatively connected to said first, second and third analog switches for controlling said first, second and third analog switches, to change the gain of the amplification means by changing the total resistance of the series-connected first, second and third resistor groups.

8. The apparatus as claimed in claim 7, wherein each of said scintillation detecting units includes a photomultiplier.

9. The apparatus as claimed in claim 7, wherein the total resistance of the resistors of said first resistor group is greater than the total resistance of the resistors of said second resistor group, and the total resistance value of the resistors of said second resistor group is greater than the total resistance of the resistors of said third resistor group.

10. The apparatus as claimed 7, wherein said up/down counter outputs to each of said first, second and third analog switches a 3-bit binary preset signal for controlling the analog switches.

11. The apparatus as claimed in claim 7, wherein said first resistor group is comprised of seven individual resistors each having a resistance value of 6.4 kΩ, said second resistor group is comprised of seven individual resistors each having a resistance value of 0.8 kΩ, and said third resistor group is comprised of seven individual resistors each having a resistance value 0.1 kΩ.

12. The apparatus as claimed in claim 7, further comprising:
a plurality of light sources positioned adjacent to said light input surfaces of said scintillation detection units; and
a light source control means for controlling the supply of power to each of said plurality of light sources to independently derive said deviation signals for each of said scintillation detection units.

* * * * *